Sept. 21, 1943.     C. A. OTTO     2,330,078
REGULATING DEVICE
Filed July 10, 1939     2 Sheets-Sheet 1
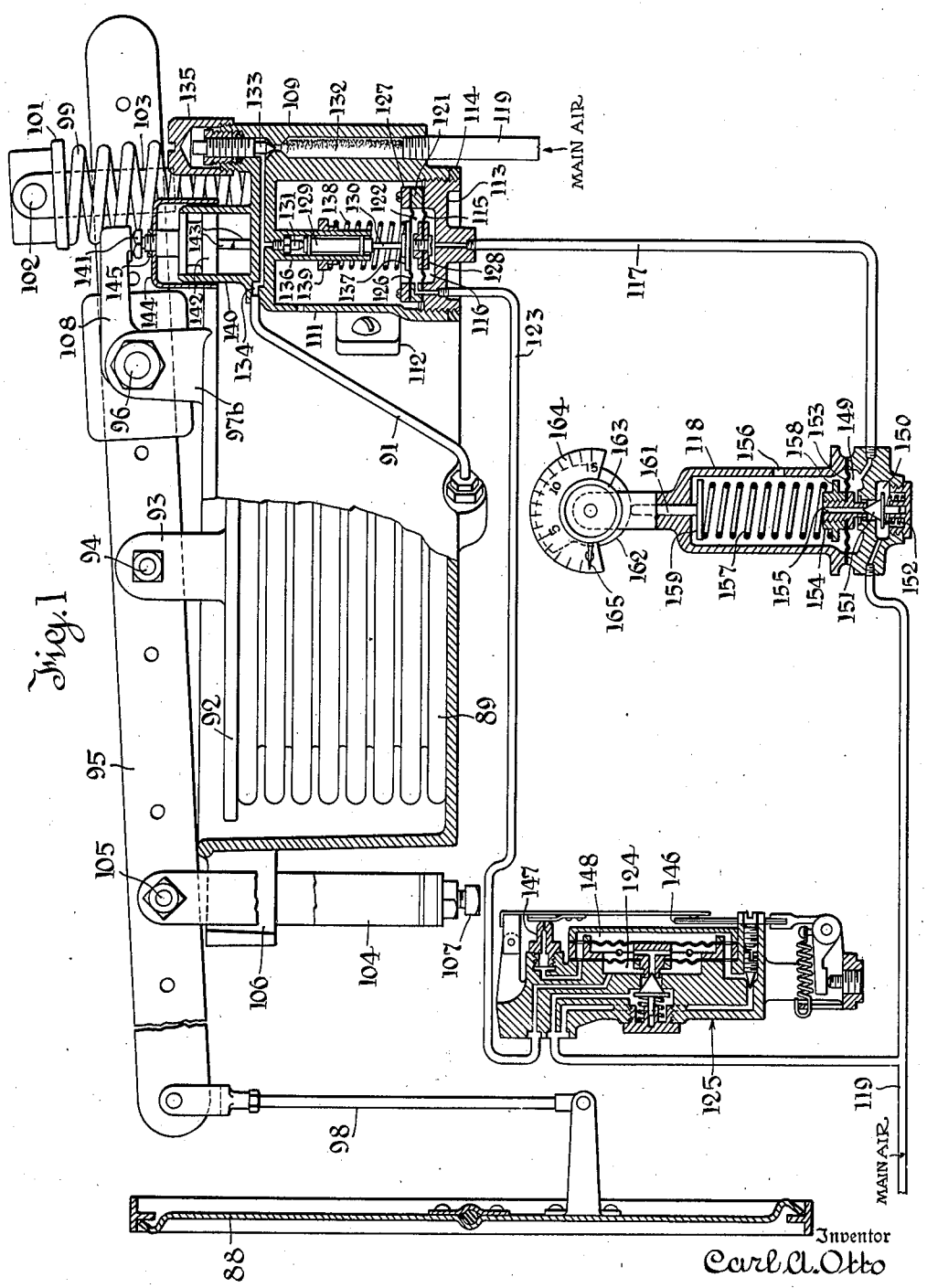
Inventor
Carl A. Otto
By
Attorneys

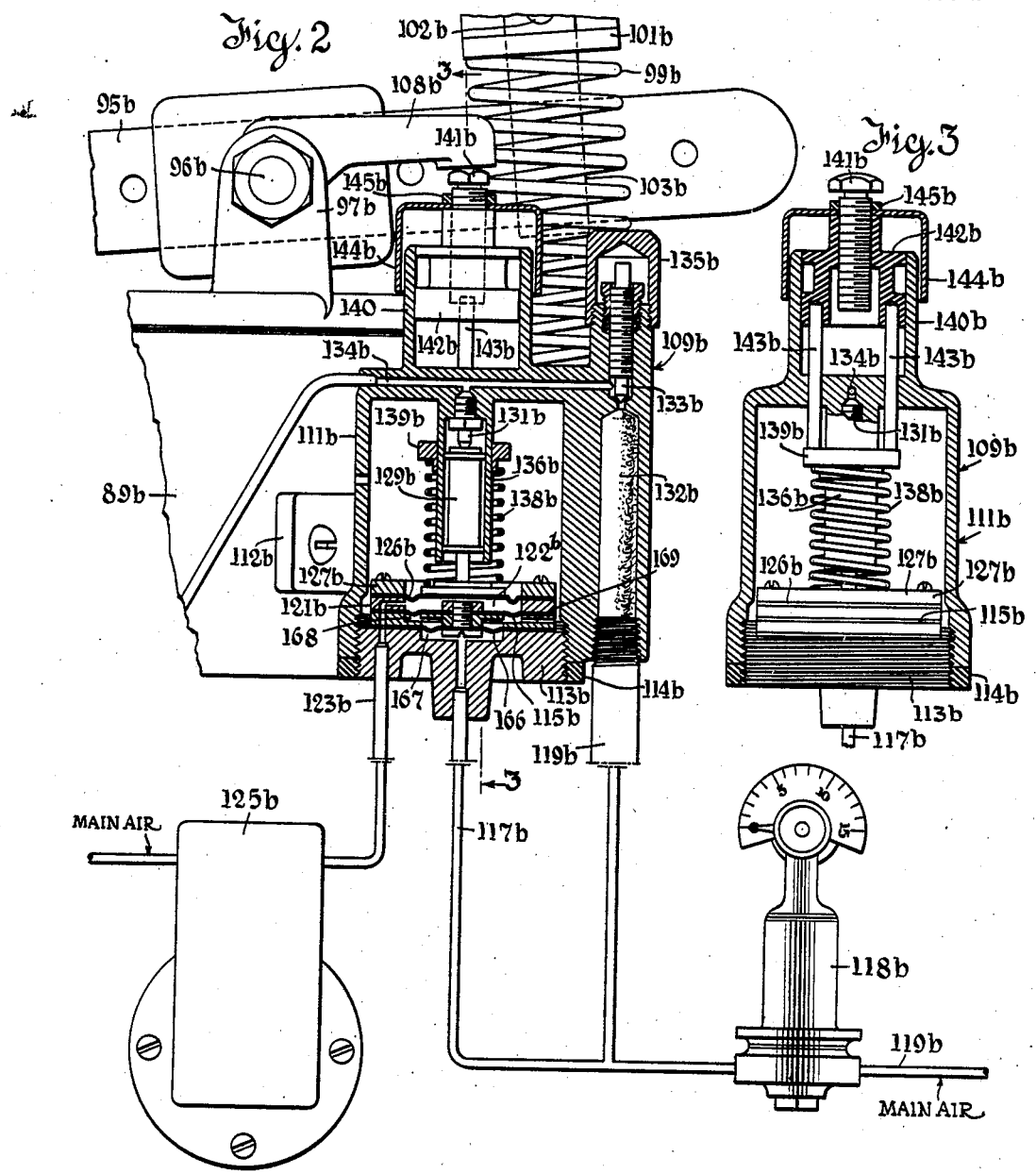

Patented Sept. 21, 1943

2,330,078

UNITED STATES PATENT OFFICE 2,330,078

REGULATING DEVICE

Carl A. Otto, Milwaukee, Wis., assignor to Johnson Service Company, Milwaukee, Wis., a corporation of Wisconsin Application July 10, 1939, Serial No. 283,704

11 Claims. (Cl. 236—82)

This invention relates to regulating systems and particularly to regulating systems of the pneumatic type. In its broadest aspects it comprises a modification and refinement of known types of apparatus to make possible duplex control, that is, control by each of two means, one of which may be arranged to establish a limit upon the action of the other.

The invention finds its greatest application in the regulation of atmospheric conditions such as temperature, humidity, and the like, and therefore is concerned with the control of apparatus for varying the rate of flow of heat exchanging media.

In the art of regulation employed in temperature and humidity control, it has been the usual practice to operate valve means for controlling the flow of heat exchanging media by the direct application of branch line pressure to a pressure or diaphragm motor. In such arrangements the branch line pressure, serving as a pilot pressure to control a throttling valve, is derived from a main source of pressure usually amounting to approximately 15 pounds per square inch.

In my prior application Serial No. 211,648, filed June 3, 1938, Patent No. 2,258,366, dated October 7, 1941, I have disclosed apparatus wherein a pilot pressure control is employed to simplify the system and to present substantially all the advantages of both pneumatic and hydraulic systems. In other words, to have the flexibility and speed of operation which is characteristic of pneumatic systems and concurrently the inherent stability of hydraulic systems. In that application a leak port is subjected to control by a valve operated by a diaphragm in response to variations in branch line pressure, and the arrangement is such that extremely small movements of the leak port controlling valve are sufficient to produce substantial variations in the control pressure supplied to the device to be controlled.

The present invention contemplates improvements making possible the duplex control above mentioned, not only in systems wherein there is direct application of branch line pressure to a pressure or diaphragm motor, but also to systems in which pilot pressure control is employed in a manner suggested by the application above identified. In bringing this about, certain modifications and improvements have been made in the structure of the application above mentioned and also in the relay mechanism described and claimed in the patent to Otto No. 1,500,260, July 8, 1924. That patent describes a relay in which an abutment structure subjected in one direction to the controlling pressure and in the other direction to the controlled pressure, operates an inlet and exhaust valve mechanism which functions to vary the controlled pressure so that a balance is maintained between it and the controlling pressure.

As shown in the aforesaid Otto Patent 1,500,260, the diaphragm structure may have different effective areas subject to the controlling pressure and the controlled pressure, and where this arrangement is used the controlled pressure will vary in direct proportion to the controlling pressure but will not be strictly equal thereto. This type of relay has been extensively used in conjunction with thermostats and humidostats, the thermostatic element serving to vary the controlling pressure by means of the well known leak port mechanism. The controlled pressure has been used to actuate various types of motor, notably damper motors, valve motors, and similar mechanisms familiar to those skilled in the arts of temperature and humidity regulation.

The purpose of the present invention is to permit the application of a secondary control which acts through the relay and may itself respond to a second controlling pressure. This pressure may be developed pneumatically, or it may be developed by other yielding means such as a variably stressed spring. The secondary control is so related to the relay mechanism that the secondary control takes effect to the exclusion of the primary control if the secondary control predominates, whereas the primary control takes effect to the exclusion of the secondary control if the primary control dominates. Thus a completely selective action is had and the principle is applicable to the attainment of a number of useful functions.

For example, the primary control might be in response to room temperature. The secondary control might be set to establish a minimum value on the operation of the primary control so that if the primary control attempted to function beyond the limited range established, the secondary control would take over. In the preferred embodiment of the invention the secondary control involves the use of an adjustable pressure maintaining valve, the adjustment being made manually. Obviously, such an adjustment might be secured by any means, according to the particular results which it is desired to secure.

Broadly stated, the invention provides a relay or a pilot device which will automatically respond to either of two pressures, depending on which of the two is higher. The invention is claimed generically in my Patent No. 2,272,815, dated February 10, 1942, the present case being restricted to application of the duplex control principle to pilot devices. Further, one of the pressures might be fluid pressure and the other might be developed by a loading spring, for example. If a spring is used in the arrangement of Fig. 1 the loading spring will establish the minimum value below which the primary controlling pressure could not exercise its regulatory function. The scheme is open to a wide variety of applications and the specific disclosures hereinafter made are intended to be illustrative and not limiting.

In the drawings:

Fig. 1 is a digrammatic view of a damper controlling means embodying the present invention with the duplex control applied to a pilot device.

Fig. 2 is a view similar to Fig. 1 with parts broken away and illustrating a modification in which certain parts of the apparatus are simplified over the form of Fig. 1; and Fig. 3 is a section on line 3—3 of Fig. 2.

The drawings show the application of the invention to a system of indirect control through a pilot valve, the secondary control being exercised by a pressure maintaining valve.

In Fig. 1 reference character 88 designates a damper vane for the control of flow of heat exchanging medium, said damper being under the control of a bellows motor 89 adapted to receive pressure fluid through pipe 91. The head 92 of the bellows carries a lug 93 providing a floating pivot 94 for a lever 95 movable about a fixed pivot 96 carried by lug 97 on the frame of the motor. The left hand end of lever 95 is connected to the vane 88 through suitable operating linkage designated 98.

The lever 95 is biased to the damper closing position shown by spring 99 reacting between the pad 101 carried by the end of lever 95 and a spring seat on the frame of the motor. The pad 101 is pivoted at 102 to a clip 103 adjustably mounted on the lever 95. Opening movement of the damper is limited by a floating stop 104 pivoted to lever 95 at 105, and straddling a lug 106 carried by the casing of the motor. An adjusting screw 107 carried by the stop 104 permits variations in the limit of travel of lever 95 by engagement between the end of this screw and the bottom of lug 106. The lever 95 also has attached to it a diverging arm 108 for following up the movements of pilot valve 109 which will now be described.

The pilot valve 109 comprises a casing 111 adapted to be attached to the frame of the motor as by lug 112. This casing is hollow and is closed at its lower end by a threaded plug 113 secured in position by locking ring 114. The plug 113 is recessed and cooperates with a diaphragm 115 to form a control chamber 116 to which air pressure may be supplied through line 117 and pressure controlling valve 118 from the main source of air pressure 119. Diaphragm 115 is held in position by a ring 121 defining a second control chamber 122 connected to pipe 123 and thence to the controlled chamber 124 of a pressure responsive relay 125. The upper wall of chamber 122 is formed by a second diaphragm 126 held in position by a clamping ring 127, both of the rings 121 and 127 together with the two related diaphragms being secured to the plug 113 by screws as shown.

The diaphragm 115 carries an abutment 128 made up of a pair of rigid plates clamped together by a screw and adapted, when pressure in chamber 116 predominates over that in chamber 122 to cause the abutment to engage the diaphragm 126 and move it upwardly. Similarly, the movement of diaphragm 126 is responsive to pressure in chamber 122 when that pressure exceeds the pressure in chamber 116. It will thus be seen that the pilot valve 111 contains two control chambers, namely 116 connected to the pressure controlling valve 118, and chamber 122 connected to relay 125. These two chambers in conjunction with the diaphragms 115 and 126 cooperate to control the position of valve or plug 129 associated with leak port 131 which receives air from main line at 119 through filter 132, pin valve 133 and connection 134. The filter strains the air. Pin valve 133 controls the rate of supply of air to leak port 131 and to pipe 91. The pin of the pin valve may be moved in or out to control the flow, the pin being protected against tampering by a cap 135 threaded onto an extension of the housing 111 as indicated in the drawings.

The valve 129 is guided in a tubular extension 136 depending from the top of valve casing 111 and suitably apertured and threaded to receive the fitting for leak port 131. Stem 130 of valve 129 is connected to an enlargement 137 abutting and secured to the top diaphragm 126 so that movement of this diaphragm produces corresponding movement of the valve 129. The enlargement 137 acts as a seat for biasing spring 138. The top of this spring seats against a flanged ring 139 slidable on the tubular extension 136. The spring 138, therefore, coordinates the movement of valve 129 and that of ring 139.

The ring 139 has its position determined by the position of lever 95, the arm 108 engaging an adjustable screw 141 carried by a plug piston 142 movable in the tubular extension 140 on the top of pilot valve casing 111. The piston 142 carries two diametrically related stop pins 143 which are seated in recesses in the piston 142 and guided by openings in the top of casing 111. The lower ends of pins 143 abut the ring 139 and coordinate the movement of this ring with that of piston 142. The piston 142 carries a bell-shaped cap 144 having a depending skirt and is held in position by a suitable lock nut 145. This skirt encloses and shields the bearing surface between the piston and the inside of extension 140 against the entrance of foreign matter tending to interfere with the ready movement of the parts. Consequently, downward movement of arm 108 results in compression of spring 138 against the top surface of diaphragm 126, and hence induces a downward movement of valve 129. On the contrary, upward movement of arm 108 releases the pressure on spring 138, permits the diaphragm 126 to assume a position determined by the pressure in chamber 122 or chamber 116 whichever predominates, and to establish an equilibrium with the pressure of spring 138. The piston 142 and the extension 140 acting as a guiding means to control the movements of the arm 108 and the ring 139.

Although numerous types of control instrument might be employed for purposes of illustration, the control is shown as being responsive to temperature variations in a thermostatic element associated with the relay 125.

This relay is of the type disclosed in the Otto Patent 1,500,260 and comprises a controlling diaphragm chamber 148, and a controlled diaphragm chamber 124. The flow of air to the controlling chamber takes place through the usual adjustable flow restricting pin valve, and the escape of air from that chamber is controlled by leak port 147 subject to the response of thermostatic element 146. The usual spring-biased cone valve controls the supply of air to, and its exhaust from, the controlled chamber 124. The space between the diaphragms is vented to atmosphere, as indicated, and is subject to control by the cone valve. This structure is conventional in the art and it is believed that more detailed explanation of its operation would be superfluous.

It has been indicated above that movement of the valve 129 associated with leak port 131 depends upon pressure in the controlling chambers 116 and 122. Predominance of pressure in chamber 116 causes engagement of abutment 128 with diaphragm 126, and thus the pressure in chamber 116 assumes control. When, however, pressure in chamber 122 predominates over that in chamber 116, the control of the leak port 131 is in response to variations in pressure in branch line 123.

Under certain conditions, such as those enumerated at the beginning of this specification, it is desirable to have a manually operable means available to exert duplex control of the position of the damper without interfering with subsequent automatic control of the same. Such an arrangement is provided by the auxiliary control chamber 116, and the pressure regulating valve 118 associated with it. Valve 118 comprises a controlling chamber 150 adapted to be supplied with air from line 119. A controlled chamber 149 is connected through pipe 117 to the chamber 116. A conical valve 151 biased to upward position by spring 152 controls the flow of air from chamber 150 to chamber 149, the upper wall of the chamber 149 being formed by a flexible diaphragm 153 and carrying an abutment 154 containing an exhaust duct 155 leading to the interior of the valve body above the diaphragm 153 and thence to atmosphere through port 156. Abutment 154 cooperates with the end of valve 151 to control the supply of air from chamber 150 to 149 and the exhaust of air from chamber 149 to atmosphere. A loading spring 157 is seated on a flange 158 of abutment 154, and its upper end reacts against a seat 159 carrying a pin 161 guided in the top of the housing of the valve and engaging a rotatable cam 162. Rotation of cam 162 by handwheel 163 moves the pin 161 to change the pressure transmitted by spring 157 to abutment 154, and thence to diaphragm 153. The position of cam 162 is indicated by scale 164 in cooperation with a pointer 165 attached to handwheel 163.

When it is desired to establish pressure in chamber 116 to move the damper to predetermined position, the handwheel 163 is moved to the proper indication on the scale and the spring 157 closes the exhaust by bringing abutment 154 against valve 151. This movement unseats the valve so as to permit flow of main line pressure from line 119 through chamber 150, chamber 149, and line 117 to chamber 116. This flow takes place until the pressure in chamber 149 balances the pressure of spring 157 permitting valve 151 to seat and cut off the flow from chamber 150.

If the setting of valve 118, for example, indicates ten pounds pressure in chamber 116, the relay 125 may operate at any time to produce automatic control of damper 88 by supplying pressure to line 123 and thence to chamber 122 to any amount in excess of the ten pounds pressure required to balance that in chamber 116. Under such conditions the damper vane assumes a position determined by the pressure in chamber 116, and thereafter movement of valve 129 associated with leak port 131 may cause further movement of the vane when the pressure in chamber 122 is built up to the required amount to exercise that control. Of course, with the setting assumed, any fall of pressure in chamber 122 below the ten pounds in chamber 116 will restore the vane to the position determined by the ten pound setting of the manually controlled instrument.

It thus becomes possible to manually set the vane to a limiting position without distributing the automatic control beyond that limiting position.

In the modification of the invention illustrated in Fig. 2, the control chambers associated with the pilot valve are proportioned in such a way as to eliminate one pipe connection which is required in the apparatus of Fig. 1. In order to simplify the description of Fig. 2, parts which correspond to those already described will be designated by the same reference characters as before, but using the subscript $b$. In the first form of the invention the control chambers 116 and 122 have the same cross sectional area and hence the same diaphragm area is exposed to pressure in each chamber. In the present arrangement the control chamber $122b$ is arranged as before with its connection to line $123b$. However, an additional diaphragm 166 is provided and forms the top wall of an additional chamber 167 having a cross section less than that of either the chamber $122b$ or an intermediate chamber 168 which is vented to atmosphere at 169.

By this arrangement no extra main air connection is necessary for the valve 118, the pressure being taken from the same line that supplies the line $117b$. The cross sectional area of diaphragm 166 exposed to the pressure in chamber 167 is such that the reduced pressure supplied from valve $118b$ may also supply the line $119b$. The operation of the system shown in Fig. 2 is substantially that already described, and hence a brief statement will be sufficient.

It will be assumed that the tension of spring $138b$ is such that the damper starts to open when the pressure in control chamber $122b$ rises above five pounds, and is wide open when this pressure reaches ten pounds. If now the pressure in control chamber $122b$ is below five pounds but the pressure in chamber 167 rises above fifteen pounds, the damper will also start to open and will be approximately one-third of the way open when the pressure in chamber 167 reaches twenty pounds. Consequently, by varying the main air pressure between fifteen and twenty pounds, the damper can be operated from closed position to one-third open position so as to acquire the required minimum supply of fresh air. If the damper is to open further, the instrument $125b$ must increase its branch line pressure supplied through pipe $123b$. Much higher chamber pressure is required in chamber 167 than in $122b$ to operate the damper because the effective area of diaphragm 166 is less than that of $126b$. The alternation of control provided by the instrument $118b$ is possible in the manner that has already been set forth and will be understood without further explanation.

The present invention provides a simple and effective means of precise and flexible operation of dampers and other controlling devices for heat exchanging media. It brings about a practical coordination of automatic and manual control to meet a variety of unusual conditions which could not be met by the usual arrangements known in the prior art.

It is to be understood that although one particular type of control instrument is illustrated, it is not intended to limit the scope of the invention to use with this particular type of instrument.

What is claimed is:

1. In an automatic regulating system, a pressure responsive device for controlling the flow of a heat exchange medium; a source of pressure fluid; a pivot valve device operatively connected to said pressure responsive device to vary the pressure supplied to the same from said source, said pilot valve device including a leak valve; diaphragm means for operating said valve; elastic means actuated by said pressure responsive device and arranged to exert against said diaphragm means a force which is varied by the action of said pressure responsive device; means responsive to an atmospheric condition for controlling the flow of pressure fluid to said diaphragm means to vary the position of said leak valve; and auxiliary pressure fluid supplying means for establishing a limiting position of said leak valve.

2. A fluid pressure regulating system comprising a controlled device responsive to variations in pressure; a source of pressure fluid; a leak valve device for controlling the action of said controlled device; a first diaphragm chamber operatively connected to said source of fluid and having a diaphragm connected directly to said valve to control the position of the same; elastic means actuated by movement of the controlled device and arranged to exert against said diaphragm a force which is varied by the movement of the controlled device; means responsive to an atmospheric condition for controlling the pressure in said first diaphragm chamber; a second diaphragm chamber operatively associated with said first diaphragm chamber and capable of controlling the position of said valve when the pressure in the second chamber predominates over the pressure in said first diaphragm chamber; and manually operable means for controlling the supply of pressure fluid to said second diaphragm chamber.

3. A leak valve device for the control of fluid pressure, comprising a casing having a leak port of the restricted orifice type therein; a valve movable toward and away from said leak port to vary the throttling of said port; a controlled device responsive to variations in fluid pressure caused by operation of said valve; a diaphragm chamber in said casing and having a diaphragm connected directly to said valve; elastic means actuated by said controlled device and arranged to exert against said diaphragm a force which is varied by the action of said controlled device; a second diaphragm chamber in juxtaposition to said first chamber and having an abutment capable of engaging said first diaphragm to operate said valve; and means for supplying pressure fluid to said diaphragm chambers to control said valve in response to pressure variations in either of said chambers at will.

4. A leak port control unit comprising a casing having a leak port therein; a valve movable toward and away from said port for variably throttling the same; fluid pressure operated means controlled by said valve; means carried by said casing for guiding said valve in its movements; a plurality of diaphragms carried by said casing and forming a plurality of diaphragm chambers; means for permanently connecting one of said diaphragms to said valve; elastic means actuated by said fluid pressure operated means and arranged to exert against said one diaphragm a force which is varied by the action of said fluid pressure operated means; and means actuated by another of said diaphragms for at times causing movement of said one diaphragm to control said valve.

5. A leak port control unit comprising a casing having a leak port therein; a source of pressure fluid; a fluid pressure operated device; a valve movable toward and away from said port for variably throttling the same to control the escape of pressure fluid from said device; means carried by said casing for guiding said valve in its movements; a plurality of superposed diaphragms carried by said casing and forming a plurality of juxtaposed diaphragm chambers; means for operatively relating one of said diaphragms and said valve to cause concerted movement of the two; elastic means actuated by said device and arranged to exert against said one diaphragm a force which is varied by the action of said device; means carried by another of said diaphragms and capable of engaging said one diaphragm to actuate said valve; automatic means for controlling the supply of fluid to the chamber of said one diaphragm; and manually operable means for controlling the supply of fluid to the other diaphragm chamber.

6. A leak port control unit comprising a casing having a leak port therein; a valve movable toward and away from said port for variably throttling the same; means carried by said casing for guiding said valve in its movements; a plurality of diaphragms disposed in parallel spaced relation to one another to form a plurality of juxtaposed chambers in opposed relation to said valve; a valve stem extending from said valve and operatively related to the outermost one of said diaphragms; means actuated by another of said diaphragms for engaging the outermost diaphragm to at times actuate said valve; a spring seat slidable on said valve guide means; a spring interposed between said seat and said outermost diaphragm; a fluid pressure actuated device having a movable element; and a mechanical connection between said element and said spring seat to coordinate the movements of said element and said valve.

7. In a leak port control unit for pneumatic control systems a casing having a leak port therein; a source of compressed air; a compressed air operated device; a valve for controlling said leak port to control said device; a first diaphragm chamber in opposed relation to said valve and having a first diaphragm operatively related to said valve; elastic means actuated by said device and arranged to exert against said first diaphragm a force which is varied by the action of said controlled device; a second diaphragm chamber including a second diaphragm arranged to at times actuate said valve; automatic means responsive to an atmospheric condition for controlling the supply of air from said source to one of said diaphragm chambers; and manually operable means for controlling the supply of air from said source to the other of said chambers.

8. In a leak port control unit for pneumatic control systems a casing having a leak port therein; a valve for controlling said leak port; a first diaphragm chamber in opposed relation to said valve and having a first diaphragm operatively related to said valve; a second diaphragm chamber including a second diaphragm arranged to at times actuate said valve; a source of compressed air; automatic means responsive to an atmospheric condition for controlling the supply of air from said source to one of said diaphragm chambers; manually operable means for controlling the supply of air from said source to the other of said chambers; a spring opposed element to be actuated by compressed air from said source under control of said leak port; a mechanical follow-up connection between said first diaphragm and said element, including elastic means actuated by movement of said element and arranged to exert against said first diaphragm a force which is varied by the movement of said element; and cylinder and piston means for coordinating the movements of said first diaphragm and said element.

9. A leak port control unit for pneumatic control systems comprising a source of compressed air; a compressed air operated device; a casing having a duct supplied from said source; a leak port in said duct; a valve for controlling said leak port; means for guiding said valve in its movements toward and away from said leak port; two diaphragm chambers one having a diaphragm at all times operatively related to said valve, and the other having a diaphragm arranged to at times actuate said valve; elastic means actuated by said device and arranged to exert against the valve connected diaphragm a force which is varied by the action of said device; means responsive to changes in an atmospheric condition for controlling the supply of air from said source to said one diaphragm chamber; and manually operable means comprising a pressure maintaining valve for supplying air under predetermined pressure to said other chamber to operate said valve.

10. A leak port control unit for pneumatic control systems comprising a source of compressed air; a compressed air operated device; a casing having a duct supplied from said source; a leak port in said duct; a valve for controlling said leak port; means for guiding said valve in its movements toward and away from said leak port; three diaphragms arranged in superposed spaced relation to form two controlling chambers of different areas and an intermediate chamber vented to atmosphere; means for operatively relating the outer diaphragm of the larger chamber to said valve; elastic means actuated by said device and arranged to exert against said outer diaphragm a force which is varied by the action of said device; an abutment carried by the diaphragm operated by pressure in the smaller chamber, said abutment being arranged to at times engage said outer diaphragm to operate said valve; means responsive to changes in an atmospheric condition for controlling the pressure in the larger chamber; means including a pressure maintaining valve for establishing a predetermined pressure in said smaller chamber; and a common supply connection to said smaller chamber and said duct.

11. In a leak port control unit for pneumatic systems having a leak port therein; a source of compressed air; a compressed air operated device; a valve for controlling said leak port to control said device; a first diaphragm chamber in opposed relation to said valve and having a first diaphragm operatively related to said valve; elastic means actuated by said device and arranged to exert against said first diaphragm a force which is varied by the action of said controlled device; a second diaphragm chamber including a second diaphragm arranged to at times actuate said valve; automatic means responsive to an atmospheric condition for controlling the supply of air from said source to one of said diaphragm chambers; and manually operable means operable from a point remote from said unit for controlling the supply of air from said source to the other of said chambers.

CARL A. OTTO.